No. 886,006.
PATENTED APR. 28, 1908.
F. G. LYMAN.
SEED SEPARATOR.
APPLICATION FILED JULY 19, 1907.
2 SHEETS—SHEET 2.
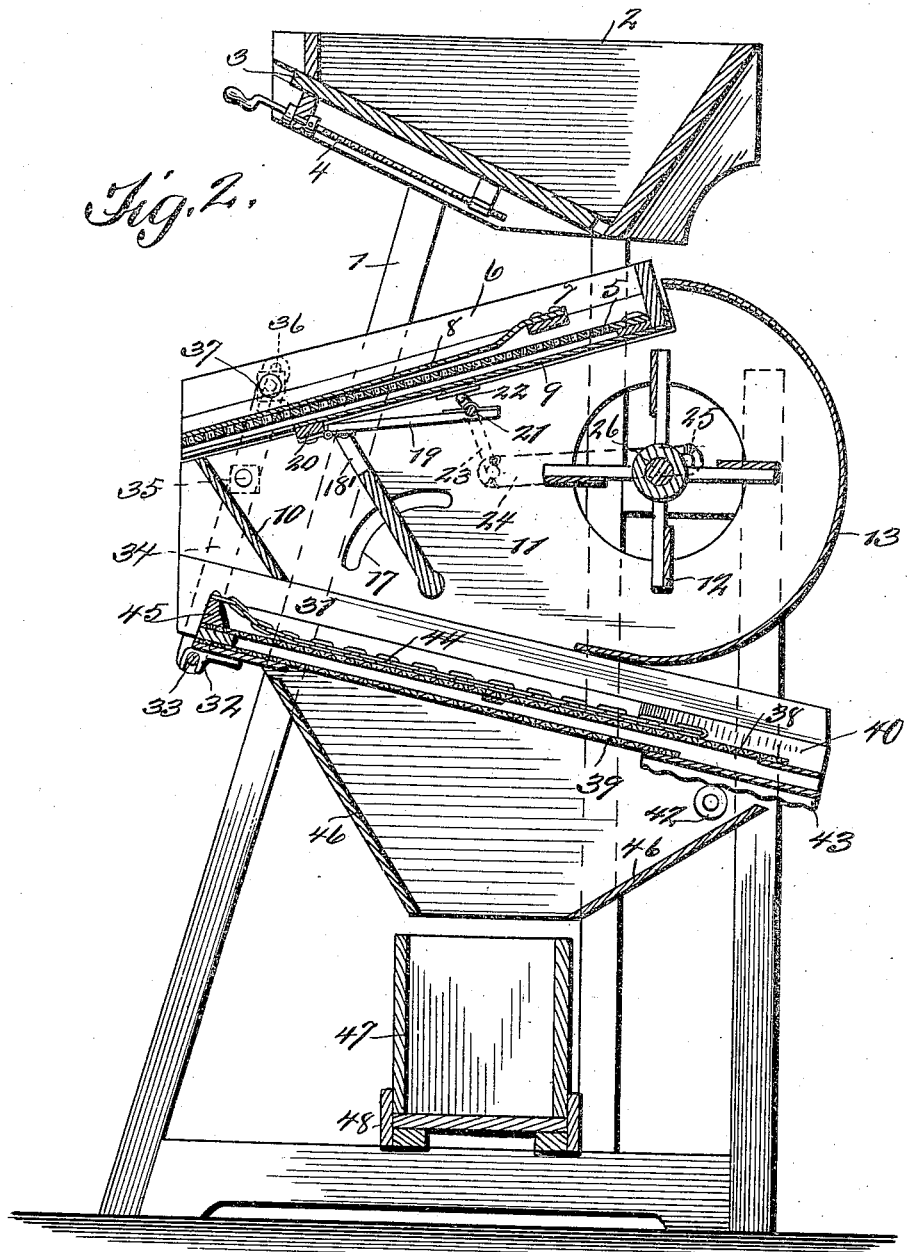

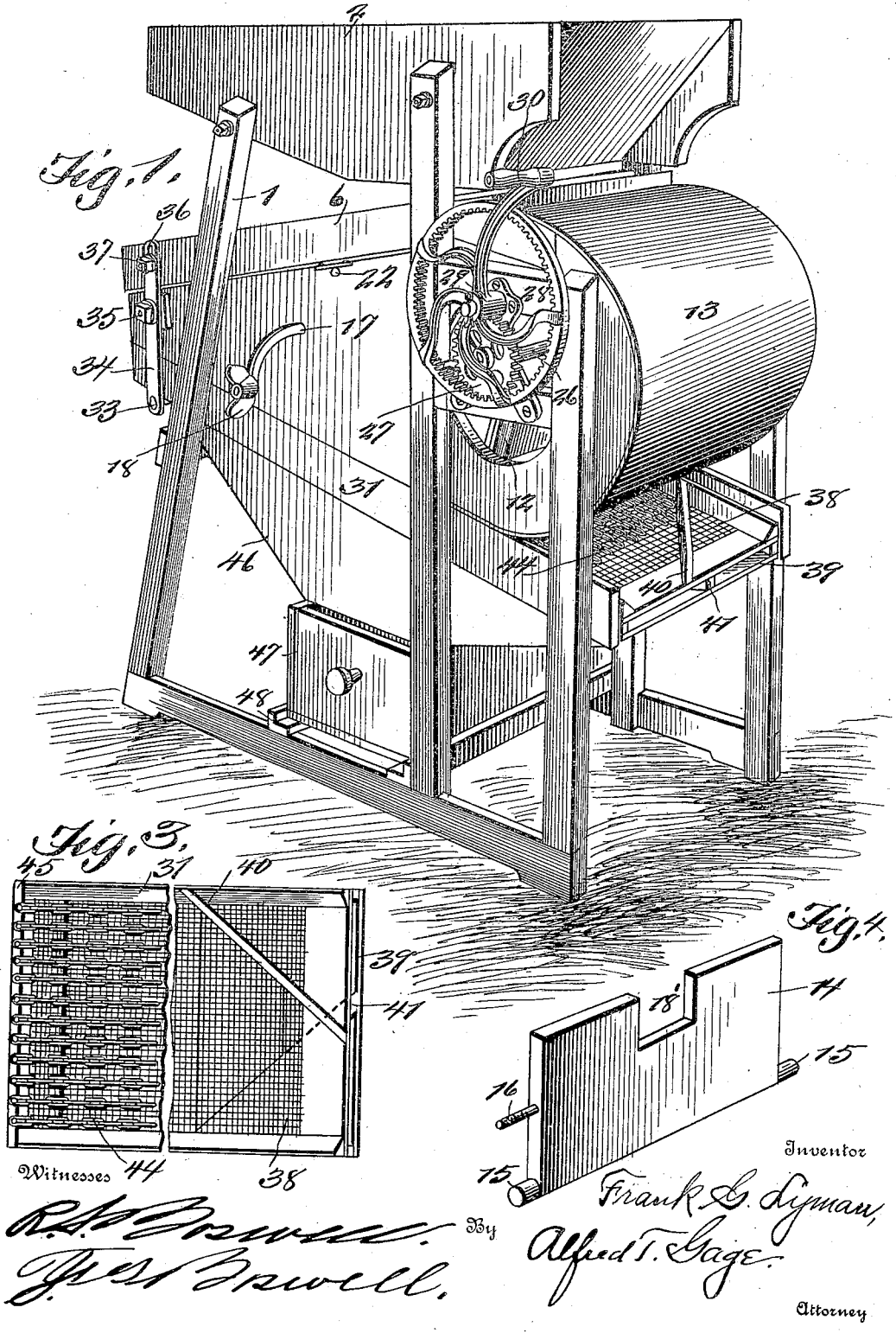

UNITED STATES PATENT OFFICE.

FRANK G. LYMAN, OF WAPAKONETA, OHIO, ASSIGNOR OF ONE-HALF TO JOHN E. GUNTHER, OF WAPAKONETA, OHIO.

SEED-SEPARATOR.

No. 886,006.  Specification of Letters Patent.  Patented April 28, 1908.

Application filed July 19, 1907. Serial No. 384,651.

*To all whom it may concern:*

Be it known that I, FRANK G. LYMAN, citizen of the United States, residing at Wapakoneta, county of Auglaize, State of Ohio, have invented certain new and useful Improvements in Seed-Separators, of which the following is a specification, reference being had therein to the accompanying drawing.

The invention relates to a seed separator and particularly to a machine for cleaning seeds by removing and separating foreign seeds and other substances therefrom.

The invention has for an object to present a novel and improved construction and arrangement of the screens so as to permit the passage through the upper screen of foreign seeds while preventing the up-ending of other seeds so that they cannot pass through the screen. The lower screen is so vibrated and the material agitated by the chains thereon as to cause a rapid separation on the upper surface while a further separation is secured by the under surface thereon with an independent delivery from each surface.

Other and further objects and advantages of the invention will be hereinafter set forth and the novel features thereof defined by the appended claims.

In the drawings—Figure 1 is a perspective of the invention; Fig. 2 a vertical section thereof; Fig. 3 is a detail plan of one screen with parts broken away; Fig. 4 is a detail perspective of the wind board; and Fig. 5 is a similar view of the connection between the crank arm and crank shaft.

Like numerals of reference refer to like parts in the several figures of the drawings.

The numeral 1 designates the frame of the machine which is provided at the top with a hopper 2 of any usual construction, preferably having the slide bottom 3 adjustable by means of the threaded rod 4 connected therewith. This hopper discharges upon the feed end of the upper screen 5 the shoe 6 of which is mounted to reciprocate in the frame 1. Above the screen a cross bar 7 is mounted from which an apron 8 extends to the tail of the screen where the oats and material not passing therethrough is delivered. The material passing through the screen falls upon the bottom 9 and is discharged therefrom onto the inclined board 10 which directs it to the lower screen. Between these screens the wind box or chest 11 is disposed and provided with the usual fan 12 disposed within the casing 13 at one end of the frame. This chest has pivoted therein the draft or wind board 14 having pivots 15 at its lower portion and operating pin 16 at one side extending through a slot 17 of the chest and having the clamping nut 18 by which the board may be held in adjusted position. This board is formed at its upper edge with a recess 18' (Fig. 4) to embrace the pitman 19 pivoted at 20 to the under face of the upper screen and at 21 to the crank shaft 22. This shaft is operated to provide a longitudinal vibration for the screen by the crank 23 at one end which is connected by bar 24 with the crank arm 25 on the end of the fan shaft 26. (Fig. 5). The fan shaft is provided with the gear 27 on its opposite end meshing with the internal gear 28 mounted at 29 and having operating handle 30 (Fig. 1).

The lower screen is mounted in a shoe 31 supported at one end by a bearing 32 on its under face which rests on a cross rod 33 carried by the lower ends of the levers 34. These levers are pivoted at 35 to each side of the wind chest 11 and connected to the upper shoe 6 by a slotted end 36 embracing a pivot 37 thereon. The lower screen is composed of the upper surface 38 and the lower surface 39 of different mesh and spaced from and parallel to each other. The upper surface is provided with a delivery bar 40 extending diagonally across the tail thereof so as to direct the discharge to one side of the center of the screen. The under sieve is also provided with a similar bar 41 oppositely disposed so that these two surfaces may deliver at the same end of the screen. The lower end of the shoe 31 is supported and given a vertical vibration by means of the roller 42 pivotally mounted upon a fixed part in connection with the face 43 carried by the bottom of the shoe. Upon the top of the upper surface a series of chains 44 are disposed with free ends in parallel lines. These chains are secured to the bar 45 at the head of the shoe and by the longitudinal and vertical vibration thereof agitate and upend the grain to cause its passage through the upper screen surface. The material passing through the lower screen surface falls into the collecting chute 46 by which it is directed into the box 47 slidably mounted at 48 upon the base of the frame. A desirable construction of screen has been hereinbefore described, but these screens or sieves may be changed to suit the character of material to be separated thereby.

In the operation of the invention the seed or grain from the hopper falls upon the upper screen and passes beneath the fabric apron which lies loosely thereon. The wheat and smaller material passes through this screen in its vibrations while the oats, joints of stalks and similar material is held in horizontal position by the apron and prevented from up-ending so as to pass through the screen. Such material is discharged from the machine at the end of this screen and the material which passes through the upper screen falls at the head of the lower screen. The chains upon this screen in connection with the vertical and horizontal vibration thereof upends the ripple or buckhorn which is driven through the screen by contact with the moving chains which also keep the screen cleaned. This lower screen grades the wheat and separately collects the cheat and cracked wheat. The use of two surfaces of different mesh on the lower screen provides from a double separation thereon and an independent collection from each surface. The vibrating connections herein described provide for a positive movement of the shoes carrying the screens so as to secure the most efficient and clean separation of seeds or grains which differ in size or configuration.

Having described my invention and set forth its merits what I claim and desire to secure by Letters Patent is—

1. The combination with a frame, of an inclined screen, means for vibrating said screen longitudinally, a series of chains extending longitudinally of the screen and having free ends resting thereon at its lower end, and means for vertically vibrating the lower end of said screen.

2. The combination with a frame and inclined screen therein, of a fan and driving shaft therefor, a crank shaft beneath the screen provided with an arm at one end connected with said driving shaft, and a pitman pivoted at opposite ends to said crank shaft and the under face of said screen.

3. The combination with a frame and oppositely inclined screens, of a wind box disposed between the screens, a fan and driving shaft therefor provided with a crank arm, a crank shaft beneath the upper screen connected to said arm, a pitman pivoted to said crank shaft and pivotally connected to the under face of said screen, and a lever extending from the tail of the upper screen to the head of the lower screen.

4. The combination with a frame and oppositely inclined screens, of a wind box disposed between the screens, a fan and driving shaft therefor provided with a crank arm, a crank shaft beneath the upper screen connected to said arm, a pitman pivoted at its opposite ends to said crank shaft and screen, levers at opposite sides of the frame pivoted to the tail of the upper screen and connected by a cross bar at their lower ends, a bearing upon the head of the lower screen resting upon said cross bar, and means to vibrate the opposite end of the lower screen vertically.

5. The combination with a frame and oppositely inclined screens, of a wind box disposed between the screens, a fan and driving shaft therefor provided with a crank arm, a crank shaft beneath the upper screen connected to said arm, a pitman pivoted to said crank shaft and screen, levers carried by the frame and pivotally connected to the tail of the upper screen and head of the lower screen, means to vibrate the tail of the lower screen vertically, and a series of parallel chains secured at the pivoted end of the lower screen and having free ends lying thereon.

6. The combination with a frame, of oppositely inclined screens therein, a wind chest disposed between said screens, means extending from the fan of said chest to vibrate said screens longitudinally, comprising a crank shaft beneath the upper screen and a pitman extended therefrom toward the tail of said screen and pivoted thereto, and a wind board adjustably mounted in said chest and provided with a recess to embrace said pitman.

In testimony whereof I affix my signature in presence of two witnesses.

FRANK G. LYMAN.

Witnesses:
 NEAL TAYLOR,
 J. AL. DOBIE.